United States Patent [19]
Hassenauer

[11] 3,915,520
[45] Oct. 28, 1975

[54] ELASTOMERIC RAILWAY CAR SIDE BEARING

[75] Inventor: Robert L. Hassenauer, Wilmette, Ill.

[73] Assignee: Evans Products Co., Des Plaines, Ill.

[22] Filed: May 14, 1974

[21] Appl. No.: 469,641

[52] U.S. Cl. ............... 308/138; 105/199 CB; 267/3
[51] Int. Cl.² ... B61F 5/14; B61F 5/24; F16C 17/04; F16F 1/.36
[58] Field of Search ................ 105/199 CB; 267/3; 308/138

[56] References Cited
UNITED STATES PATENTS

| | | | |
|---|---|---|---|
| 2,301,372 | 11/1942 | Cottrell | 308/138 |
| 2,350,301 | 5/1944 | Cottrell | 308/138 |
| 3,556,503 | 1/1971 | VanMoss, Jr. | 267/3 |
| 3,707,927 | 1/1973 | Geyer et al. | 308/138 |
| 3,719,154 | 3/1973 | Reynolds | 267/3 X |
| 3,735,711 | 5/1973 | Hassenauer | 105/199 CB |

Primary Examiner—M. Henson Wood, Jr.
Assistant Examiner—Howard Beltran
Attorney, Agent, or Firm—F. Travers Burgess

[57] ABSTRACT

A conversion unit is provided for converting the cage of a roller side bearing to a constant contact resilient side bearing. The unit comprises a plurality of elastomeric pads bounded by and interleaved by metal plates, with a contoured elastomeric surface on the bottom boundary plate for engagement with the concave upper surface of the roller seat, and a cap casting carried by the upper boundary plate and having depending flanges at its ends extending into the end portions of the roller cage.

11 Claims, 5 Drawing Figures

ELASTOMERIC RAILWAY CAR SIDE BEARING

BACKGROUND OF THE INVENTION

1. Field of the Invention

The invention relates to railway rolling stock and consists particularly in a constant contact resilient side bearing utilizing laminated elastomeric pads.

2. The Prior Art

Constant contact resilient side bearings comprising laminated rubber pads arranged to be seated on the flat top surface of a truck bolster, surrounded by a housing wall, and mounting an upwardly facing bearing plate, or cap, have been provided. Many cars are equipped with roller side bearings comprising an upwardly open housing, or cage, with a concave bottom wall forming a seat for the roller. If it is desired to replace such roller side bearings with conventional constant contact resilient side bearings, the entire roller side bearing, consisting of the cage, as well as the roller or rollers, must be removed from the truck bolster. This is an expensive, inconvenient, time consuming operation requiring removal of the trucks from the car because the cages are normally riveted to the bolster.

SUMMARY OF THE INVENTION

The invention provides means for converting a roller side bearing to a constant contact resilient side bearing. To this end, the roller cage is utilized as a housing for the constant contact resilient side bearing conversion unit, which is constructed for mounting within the roller cage. An objective of the invention is the provision of means for stably supporting the conversion unit on the concave bottom surface of the roller cage and preventing fore and aft movements of the conversion unit in the cage when the truck bolster commences hunting movements. This objective is accomplished by providing deformable elastomeric pads on the bottom surface of the conversion unit base. These pads are generally contoured in conformity with the concavity, but are somewhat oversize so as to provide a close fit.

Another object of the invention is to provide the maximum volume of elastomeric material in the conversion unit consistent with the restricted space provided in the roller cages while preventing contact between the elastomeric pads and the upright walls of the cage. This object is attained by making the long sides of the individual elastomeric pads concave in plan so that when the pads compress, the long side would not bulge outwardly into engagement with the inside surface of the cage side wall. Such engagement could damage the pad and accordingly shorten its life.

DETAILED DESCRIPTION OF THE INVENTION

Figure 1:
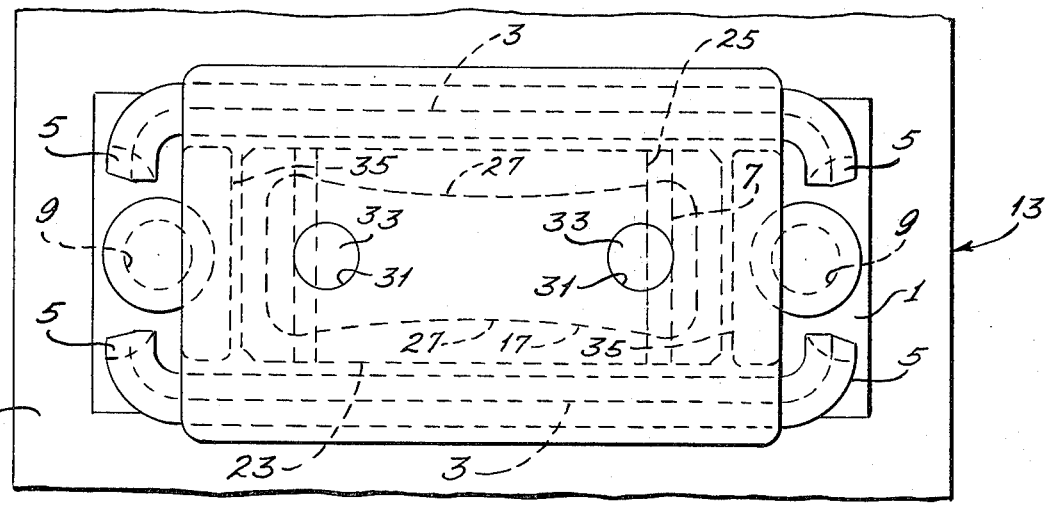
FIG. 1 is a top view of a converted side bearing.
Figure 2:
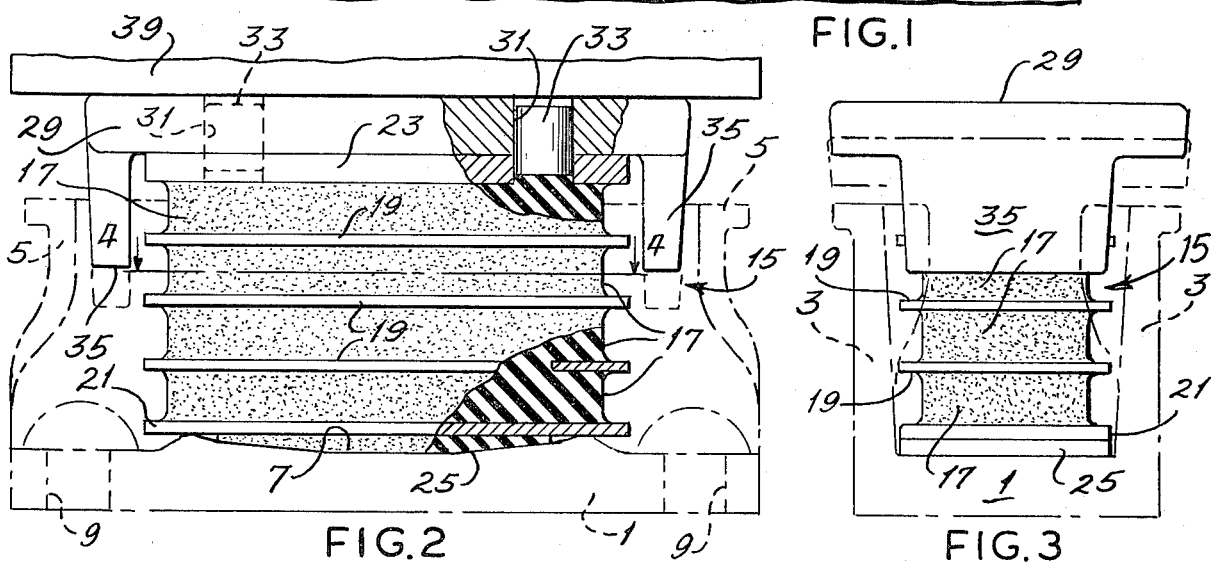
FIG. 2 is a side elevational view of the constant contact resilient conversion unit partially sectionalized, as applied to a roller side bearing cage.
Figure 3:
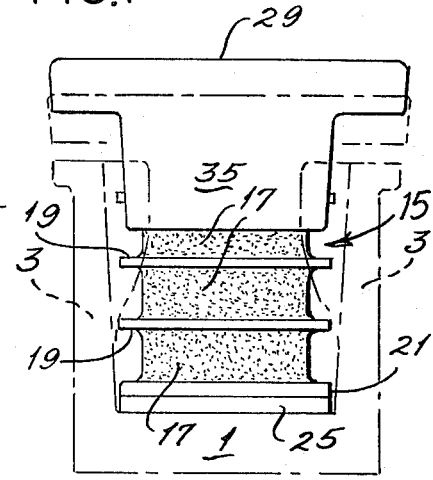
FIG. 3 is an end view of the constant contact resilient conversion unit as applied to a roller side bearing cage.

The numeral 1 indicates the horizontal bottom wall of a cage for a roller side bearing having longitudinally extending upright side walls 3 bent inwardly at their ends to form roller retaining projections 5, the ends of the cage being otherwise open. Bottom wall 1 is formed with a shallow arcuate recess 7, curved about an axis transverse of the cage, to form a supporting seat for a roller. Bottom wall 1 also includes longitudinally spaced apart holes 9 to receive rivets or other fasteners, for securing the cage to the upper surface 11 of a railway truck bolster generally indicated at 13.

For converting a roller side bearing having a cage as described above to a constant contact resilient side bearing, I provide a conversion unit generally indicated at 15. Conversion unit 15 comprises four flat generally rectangular elastomeric pads 17 bonded to and interleaved by flat rectangular metal plates 19. The bottom of lowermost pad 17 is bonded to a base plate 21, and the top of uppermost pad 17 is bonded to top plate 23.

To fix the position of unit 15 longitudinally of cage 1, 3, 5, 7, a thin elastomeric pad 25, contoured generally to be matingly received in roller seat recess 7, is bonded to the bottom of base plate 21.

Figure 4:
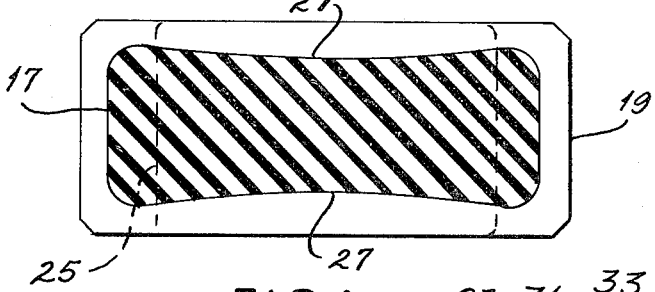
FIG. 4 is a horizontal sectional view taken along line 4—4 of FIG. 2.

Plates 19, 21 and 23 are of the same dimensions in plan and are of slightly less width than the transverse space between cage side walls 3. Pads 17 are slightly narrower and shorter than plates 19, 21 and 23, and their sides are slightly concave in plan, as at 27, as best seen in FIG. 4, whereby under maximum compression under load, the pads will not bulge outwardly beyond the edges of the plates and thereby come into frictional engagement with the cage sides. This makes it possible to provide the maximum volume of elastomeric material in the limited area available within the roller cage.

A metal cap member 29, preferably a casting, generally rectangular in plan, and of greater width than top plate 23 rests on top plate 23 and is formed with a pair of apertures 31 to receive upstanding pins 33 on top plate 23 and thereby prevent horizontal movement of cap member 29 with respect to top plate 23. At its ends cap member 29 is formed with depending flanges 35, the outer surfaces of which are spaced slightly closer to each other than the end projections 5 on the roller cage side walls, so that flanges 35 would not normally engage projections 5, but could engage them to limit longitudinal movement of cap member 29 with respect to the roller cage.

Utilizing the conversion unit described above, trucks fitted with roller side bearings can be converted to constant contact resilient side bearings without removing the trucks from the car and removing the roller bearing cages from the truck bolster, as is required when roller side bearings are replaced by conventional constant contact side bearings.

With conversion unit 15 of the present invention, it is unnecessary to remove the roller bearing cage from the truck bolster or to remove the trucks from the car body. The car body is jacked up, the rollers are removed from the cages, the pad devices 17–25 are inserted in the cages with pads 25 seated in roller seats 7, cap members 29 are fitted on pad device top plates 23, and the car body is lowered onto the truck with the body side bearings 39 in frictional engagement with cap members 29.

After application to a car, the frictional engagement of cap members 29 and the body side bearing 39 provides a horizontal frictional force, tangential to the swivel axis of the truck and in the opposite direction from hunting motion of the truck about its swivel axis, thereby opposing and damping such hunting motions of the truck about its swivel axis. The vertical resiliency of the device attenuates, but does not prevent, rock and roll motions of the supported car body.

Figure 5:
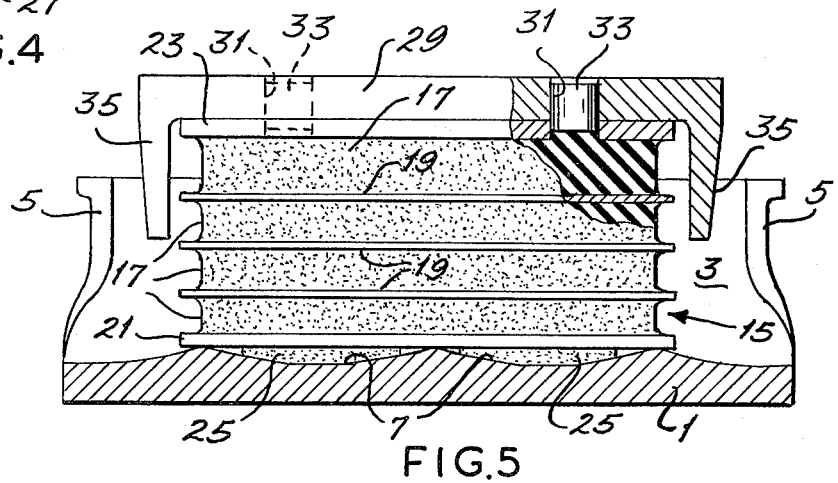
FIG. 5 is a side elevational view of a constant contact resilient conversion unit for a two-roller side bearing, showing its application to a two-roller cage.

The embodiment shown in FIG. 5 is similar to that shown in FIGS. 1–4, but is for a higher capacity car, and thus the roller cage is longer and is formed with two roller seats 7, and the pad device is provided with a pair of seating pads 25.

The details of the structure may be varied substantially without departing from the spirit of the invention and the exclusive use of such modifications as come within the scope of the appended claims is contamplated.

I claim:

1. A resilient railway side bearing device for insertion into an upwardly open structure having spaced side walls and a bottom wall formed with an upwardly open shallow recess in its top surface, comprising elastomeric pad means, horizontal bottom and top plates bonded to the bottom and top surfaces of said pad means, said plates and said pad means being generally rectangular in plan, said plates being slightly narrower than the inside spacing of the side walls, said pad means being narrower and shorter than said plates and having their sides slightly concave in plan whereby to avoid contact between said pad means and the side walls, and means for preventing shifting of said bottom plate longitudinally of the structure comprising an elastomeric pad bonded to the bottom surface of said bottom plate and adapted to extend into and conform to the surface contour of the recess.

2. A resilient railway side bearing device according to claim 1, including a metal cap carried on said top plate, and means holding said cap against horizontal movement on said top plate.

3. A resilient railway side bearing device according to claim 2 wherein said cap is detachably mounted on said top plate, said holding means comprising a pair of spaced upstanding pin-like elements on said top plate, said metal cap being apertured to receive said pin-like elements when said metal cap is seated on said top plate.

4. A resilient railway side bearing device according to claim 2, wherein the upwardly open structure has transverse wall portions at each end, and said cap means is formed with depending flanges receivable in the spaces between the ends of said plates and the transverse wall portions.

5. A resilient railway side bearing device according to claim 4 wherein the sides of said cap overlie the side walls of the upwardly open structure.

6. A resilient railway side bearing device according to claim 1 wherein said pad means comprises a plurality of flat elastomeric pads and metal plates interleaved between and bonded to adjacent pads.

7. A resilient railway side bearing device for insertion into an upwardly open structure having spaced side walls and a bottom wall formed with an upwardly open shallow recess in its top surface, comprising elastomeric pad means, horizontal bottom and top plates bonded to the bottom and top surfaces of said pad means, said plates and said pad means being generally rectangular in plan, said plates being slightly narrower than the inside spacing of the side walls, said pad means being narrower and shorter than said plates and having their sides slightly concave in plan whereby to avoid contact between said pad means and the side walls, and means for preventing shifting of said bottom plate longitudinally of the structure comprising an elastomeric pad bonded to the bottom surface of said bottom plate and adapted to be wholly received in the shallow recess.

8. A resilient railway side bearing device for insertion into an upwardly open structure having a bottom wall, spaced side walls, and a shallow recess in the bottom wall top surface, comprising elastomeric pad means, horizontal bottom and top plates bonded to the bottom and top surfaces of said pad means, said plates and said pad means being generally rectangular in plan, and an elastomeric pad bonded to the bottom surface of said bottom plate and shaped to be wholly received in the shallow recess.

9. A resilient railway side bearing device according to claim 8 wherein said recess is of arcuate shape curved about an axis transverse of said upwardly open structure, and said elastomeric pad on the bottom of said bottom plate is of generally similar contour with said recess.

10. A resilient railway side bearing device according to claim 9 for insertion into upwardly open structure formed with a pair of said arcuate recesses in longitudinal adjacent relation with each other in its bottom wall, wherein there are a pair of correspondingly related elastomeric pads of generally similar contour with the recesses bonded to said bottom plate.

11. A resilient railway side bearing device for insertion into an upwardly open structure having a bottom wall, spaced side walls, and a shallow recess in the bottom wall top surface, comprising elastomeric pad means, horizontal bottom and top plates bonded to the bottom and top surfaces of said pad means, said plates and said pad means being generally rectangular in plan, and an elastomeric pad bonded to the bottom surface of said bottom plate and adapted to extend into and conform to the surface contour of the shallow recess.

* * * * *